US008794894B2

(12) United States Patent
Lee et al.

(10) Patent No.: US 8,794,894 B2
(45) Date of Patent: Aug. 5, 2014

(54) SELF-PIERCING RIVET

(75) Inventors: Mun-Yong Lee, Busan (KR);
Byung-Jun Park, Busan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 213 days.

(21) Appl. No.: 13/325,550

(22) Filed: Dec. 14, 2011

(65) Prior Publication Data
US 2013/0094924 A1  Apr. 18, 2013

(30) Foreign Application Priority Data

Oct. 18, 2011  (KR) .......................... 10-2011-0106604

(51) Int. Cl.
*F16B 19/08* (2006.01)
(52) U.S. Cl.
USPC .......................................... 411/502; 411/448
(58) Field of Classification Search
USPC ......... 411/501, 502, 450, 471, 457–459, 504, 411/448
See application file for complete search history.

(56) References Cited

U.S. PATENT DOCUMENTS

| 1,052,682 | A | * | 2/1913 | McCrea | 411/448 |
| 1,097,498 | A | * | 5/1914 | Wyant | 411/448 |
| 1,108,483 | A | * | 8/1914 | Abramson | 411/448 |
| 1,121,641 | A | * | 12/1914 | Lounsbury | 228/56.3 |
| 1,433,411 | A | * | 10/1922 | Plant | 36/59 R |
| 3,114,921 | A | * | 12/1963 | Carusi | 470/30 |
| 3,217,584 | A | * | 11/1965 | Amesbury | 411/508 |
| 4,231,280 | A | * | 11/1980 | Gross | 411/493 |
| 4,988,249 | A | * | 1/1991 | Kardefeldt et al. | 411/513 |
| 5,271,588 | A | * | 12/1993 | Doyle | 248/68.1 |
| 6,045,291 | A | * | 4/2000 | Ruehle et al. | 403/297 |
| 6,263,560 | B1 |  | 7/2001 | Edwards | |
| 6,802,682 | B2 |  | 10/2004 | Stevenson et al. | |
| 2005/0081362 | A1 | * | 4/2005 | Leistner et al. | 29/524.1 |

FOREIGN PATENT DOCUMENTS

| DE | 19681699 C2 | 8/2000 |
| DE | 102005048863 A1 | 6/2006 |
| DE | 60311214 T2 | 10/2007 |
| GB | 732283 A | 6/1955 |
| JP | 2006-009926 A | 1/2006 |
| KR | 20-0250963 Y1 | 11/2001 |

* cited by examiner

*Primary Examiner* — Gary Estremsky

(74) *Attorney, Agent, or Firm* — Alston & Bird LLP

(57) ABSTRACT

A self-piercing rivet is disclosed. The self-piercing rivet integrally joins an upper plate member and a lower plate member overlapped with each other. The self-piercing rivet includes: a head portion; and a shank portion integrally connected to the head portion and provided with more than two slits.

12 Claims, 10 Drawing Sheets

SELF-PIERCING RIVET

CROSS-REFERENCE TO RELATED APPLICATION

This application claims priority to and the benefit of Korean Patent Application No. 10-2011-0106604 filed in the Korean Intellectual Property Office on Oct. 18, 2011, the entire contents of which are incorporated herein by reference.

BACKGROUND OF THE INVENTION (a) Field of the Invention

The present invention relates to a self-piercing rivet. More particularly, the present invention relates to a self-piercing rivet that can penetrate and join more than two joining objects.

(b) Description of the Related Art

Automotive industries pay attention to environmental problems, and apply aluminum alloy and plastic materials to a vehicle body so as to reduce weight of the vehicle body and to improve fuel consumption being one of solutions that solves the environmental problems.

For these purpose, joining methods for assembling the vehicle body have been researched and developed instead of conventional spot welding.

Recently, a self-piercing rivet using a self-piercing rivet system is increasingly used.

According to a conventional riveting technique, joining objects such as steel sheets are joined by forming a head portion after a riveting hole is bored and a rivet is inserted into the riveting hole. However, the rivet is press-fitted into the joining objects by hydraulic pressure or pneumatic pressure without forming the riveting hole according to self-piercing rivet technique. At this time, the rivet is deformed plastically and joins the joining objects.

A self-piercing rivet is used for joining metal sheets according to the self-piercing rivet technique, and the self-piercing rivet includes a head and a partially hollow cylindrical shank.

For example, a shank of the self-piercing rivet penetrates an upper sheet by a punch of a setting tool. At this time, the shank is supported by a die and is deformed outwardly. In addition, since the shank is press-fitted to a lower sheet in a state that the head portion is supported by the upper sheet, the upper sheet and the lower sheet are joined.

Since the shank of the conventional self-piercing rivet is formed as an annular piercing edge, a penetrated portion of the upper sheet is completely cut off by the annular edge when the shank penetrates the upper sheet and is press-fitted to the lower sheet.

Since the penetrated portion of the upper sheet cut off by the shank cannot form mechanical interlock of the upper and lower sheets and remains as a dead metal, joining strength of the upper and lower sheets may be deteriorated.

In addition, since the dead metal cannot join the upper and lower sheets with sufficient strength, the upper sheet rotates relatively with respect to the lower sheet.

Accordingly, various techniques for preventing rotation of the upper sheet are applied according to conventional arts. For example, a plurality of rivets is used for preventing the rotation of the upper sheet.

If the plurality of rivets is used, processes may be complicated, productivity may be deteriorated, and product cost may be increased due to increase of processes and components.

Since the shank of the rivet is formed as the annular piercing edge, the shank penetrates the upper sheet with an annular shape, and thereby increases joining load according to conventional arts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a self-piercing rivet having advantages that a penetrated portion reinforces joining strength of joining objects by improving a shape of a shank so as not to cut off the penetrated portion completely.

The present invention has been made in an effort to provide a self-piercing rivet having further advantages that rotation of joining objects is prevented and joining strength is improved by using the penetrated portion that is not completely cut off by the shank even though one rivet is used.

The present invention has been made in an effort to provide a self-piercing rivet having further advantages of reducing joining load but increasing joining strength.

A self-piercing rivet according to exemplary embodiments of the present invention integrally joins an upper plate member and a lower plate member overlapped with each other.

In one or more exemplary embodiments, the self-piercing rivet includes: a head portion; and a shank portion integrally connected to the head portion and provided with more than two slits.

In one or more exemplary embodiments, the shank portion has a connecting end connected to the head portion and a free end being an opposite end of the connecting end, and the slits are extend from the free end to the connecting end of the shank portion.

In one or more exemplary embodiments, the slits are connected with an inner space of the shank portion.

In one or more exemplary embodiments, a length of the slit is shorter than that of the shank portion.

In one or more exemplary embodiments, the slits are disposed at the shank portion circumferentially with an even distance.

In one or more exemplary embodiments, a central angle of the slits is 120 degree.

In one or more exemplary embodiments, the shank portion includes: a first portion integrally connected to the head portion and having circular cross-section; and a plurality of second portions integrally connected to the first portion and disposed between the slits.

In one or more exemplary embodiments, the second portion penetrates the upper plate member, deforms outwardly, and is press-fitted to the lower plate member.

In one or more exemplary embodiments, the slit is provided with a triangular groove at the first portion, and the groove is connected to a space of the second portion.

In one or more exemplary embodiments, edge surfaces of the second portion facing with each other through the slit are disposed in parallel with respect to an inner center axis of the first portion.

In one or more exemplary embodiments, edge surfaces of the second portion facing with each other through the slit are slanted toward an inner center axis of the first portion.

In one or more exemplary embodiments, the shank portion connects a portion of the upper plate member corresponding to the inner space with other portions of the upper plate member corresponding to the slits.

In one or more exemplary embodiments, the shank portion penetrates the upper plate member and the lower plate member, deforms outwardly, and supports the lower plate member as a staple shape.

In one or more exemplary embodiments, the self-piercing rivet joins the upper plate member and the lower plate member of the same materials.

In one or more exemplary embodiments, the self-piercing rivet joins the upper plate member and the lower plate member of different materials.

A self-piercing rivet according to another aspect of the present invention includes: a head portion; and a shank portion integrally connected to the head portion and provided with more than two slits formed in a length direction, wherein the shank portion includes a first portion integrally connected to the head portion and has cylindrical shape, and a plurality of second portions integrally connected to the first portion and disposed between the slits, and the second portion penetrates the upper plate member, is press-fitted to the lower plate member, and integrally connects a portion of the upper plate member corresponding to an inner space of the second portion with other portions of the upper plate member corresponding to the slits.

In one or more exemplary embodiments, the shank portion has a connecting end connected to the head portion and a free end being an opposite end of the connecting end, and the slits are extended from the free end to the connecting end of the shank portion, and connects an inner space of the shank portion with a space between the second portions.

A self-piercing rivet according to other aspect of the present invention includes: a head portion; and a shank portion integrally connected to the head portion and provided with more than two slits formed in a length direction, wherein the shank portion includes a first portion integrally connected to the head portion and has cylindrical shape, and a plurality of second portions integrally connected to the first portion and disposed between the slits, and the second portion penetrates the upper plate member, is press-fitted to the lower plate member, penetrates the lower plate member, deforms outwardly, and supports the lower plate member as a staple shape.

BRIEF DESCRIPTION OF THE DRAWINGS

The drawings illustrate exemplary embodiments of the present invention and are not construed to limit any aspect of the invention.

DESCRIPTION OF SYMBOLS

Figure 1:
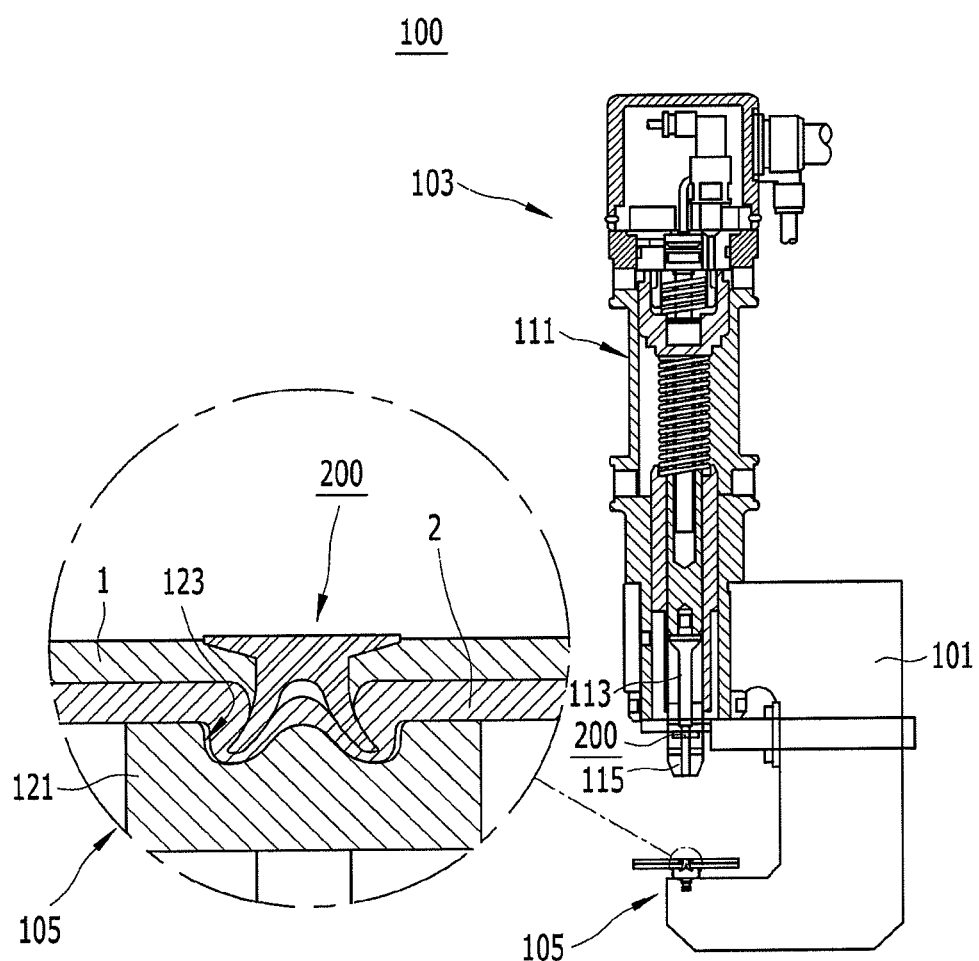
FIG. 1 is a schematic diagram of a self-piercing rivet system to which a self-piercing rivet according to an exemplary embodiment of the present invention is used.

| 1 | upper plate member | 2 | lower plate member |
|---|---|---|---|
| 10 | head portion | 50, 250 | shank portion |
| 51, 251 | first portion | 52, 252 | second portion |
| 61, 261 | slit | 101 | frame |
| 103 | punch unit | 105 | anvil unit |
| 111 | punch cylinder | 113 | punch |
| 115 | clamper | 121 | anvil die |
| 123 | forming groove | 257 | slanted surface |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

In the detailed description, ordinal numbers are used for distinguishing constituent elements having the same terms, and have no specific meanings.

FIG. 1 is a schematic diagram of a self-piercing rivet system to which a self-piercing rivet according to an exemplary embodiment of the present invention is used.

Referring to FIG. 1, a self-piercing rivet system 100 according to an exemplary embodiment of the present invention joins at least two metal sheets by a self-piercing rivet 200 (hereinafter, it will be called a "rivet").

It is exemplified in this specification that two metal sheets are used, and the two metal sheets are called an upper plate member 1 and a lower plate member 2 respectively.

The self-piercing rivet system 100 press-fits the rivet 200 into the upper plate member 1 and the lower plate member 2 overlapped with each other with a predetermined pressure, and is adapted to join the upper plate member 1 and the lower plate member 2 by plastic deformation of the upper plate member 1, the lower plate member 2, and the rivet 200.

In an exemplary embodiment of the present invention, the upper plate member 1 and the lower plate member 2 are made of plastic material, rubber material, a aluminum sheet, a steel sheet (including high-tension steel sheet).

The upper plate member 1 and the lower plate member 2 can be made of the same material or the different materials.

The self-piercing rivet system 100 includes a C-type frame 101 mounted at an arm of a robot (not shown), a punch unit 103 disposed at an upper portion of the frame 101, and an anvil unit 105 disposed at a lower portion of the frame 101 corresponding to the punch unit 103.

The punch unit 103 supplies the rivet 200, and includes a punch cylinder 111 driven by hydraulic pressure or pneumatic pressure, a punch 113 operated by the punch cylinder 111, and a clamper 115.

In addition, the anvil unit 105 includes an anvil die 121. A forming groove 123 corresponding to the punch 113 is formed at an upper surface of the anvil die 121.

The self-piercing rivet system 100 is a well-known SPR (Self-Piercing Riveting) system, and thus a detailed description thereof will be omitted in this specification.

The rivet 200 according to an exemplary embodiment of the present invention applied to the self-piercing rivet system 100 penetrates the upper plate member 1 by the punch 113 moved by operation of the punch cylinder 111, is press-fitted into the lower plate member 2, and is deformed according to the forming groove 123 of the anvil die 121 so as to join the upper plate member 1 and the lower plate member 2 integrally.

When the rivet 200 according to an exemplary embodiment of the present invention penetrates the upper plate member 1 and is press-fitted into the lower plate member 2, the rivet is adapted not to cut off a penetrated portion of the upper plate member 1 completely. Therefore, the penetrated portion reinforces joining strength of the upper plate member 1 and the lower plate member 2.

In addition, the rivet 200 according to an exemplary embodiment of the present invention uses the penetrated portion of the upper plate member 1 that is not cut off completely so as to prevent rotation of the upper plate member 1 and the lower plate member 2 even through one rivet 200 is used. In addition, joining strength of the upper plate member 1 and the lower plate member 2 is also improved.

The rivet 200 according to an exemplary embodiment of the present invention is adapted to reduce joining load of the upper plate member 1 and the lower plate member 2 but to increase joining strength.

Figure 2:
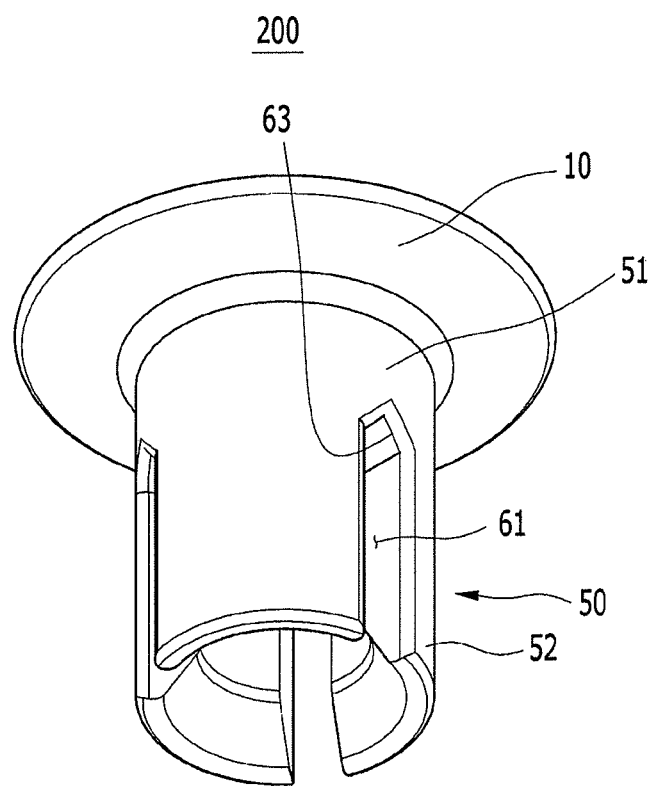
FIG. 2 is a perspective view of a self-piercing rivet according to an exemplary embodiment of the present invention.
Figure 3:
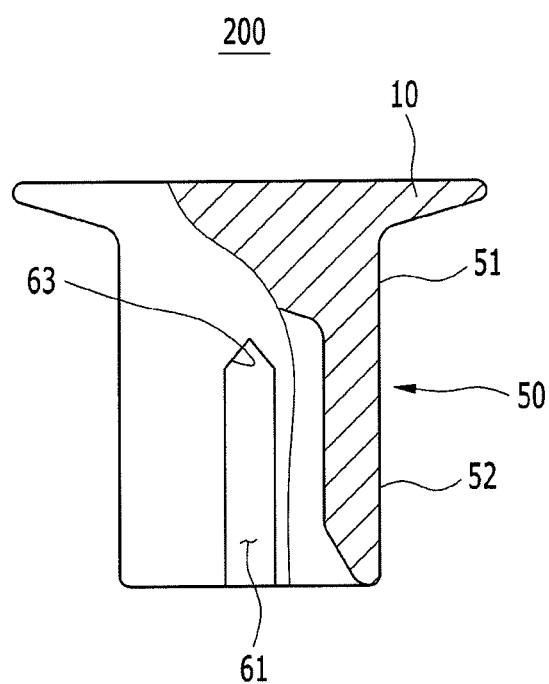
FIG. 3 is a partial cross-sectional view of a self-piercing rivet according to an exemplary embodiment of the present invention.
Figure 4:
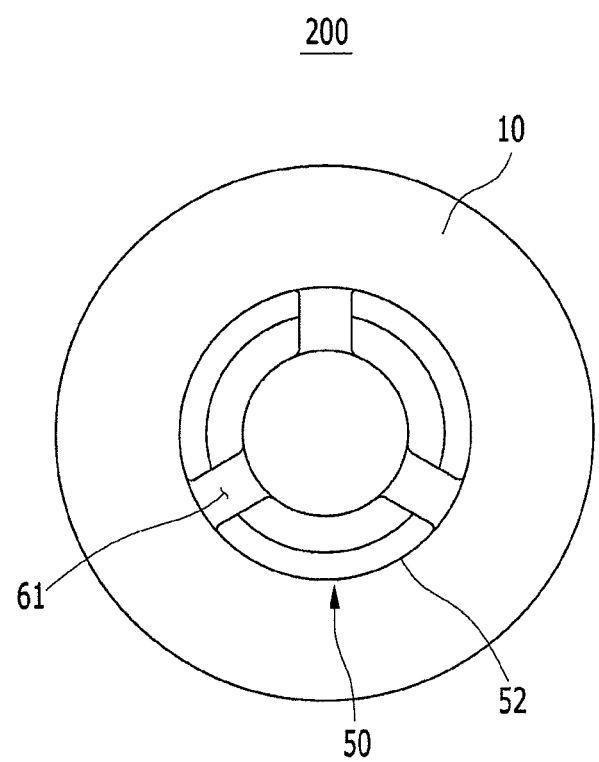
FIG. 4 is a bottom view of a self-piercing rivet according to an exemplary embodiment of the present invention.

FIG. 2 is a perspective view of a self-piercing rivet according to an exemplary embodiment of the present invention, FIG. 3 is a partial cross-sectional view of a self-piercing rivet according to an exemplary embodiment of the present invention, and FIG. 4 is a bottom view of a self-piercing rivet according to an exemplary embodiment of the present invention.

Referring to FIG. 2 to FIG. 4, the rivet 200 according to an exemplary embodiment of the present invention includes a head portion 10 and a partially hollow shank portion 50, and each component will be described in detail.

The head portion 10 receives load of the punch 113 and has a disk shape having a predetermined thickness.

In an exemplary embodiment of the present invention, the shank portion 50 penetrates the upper plate member 1 by the load of the punch 113, is press-fitted into the lower plate member 2, and is deformed outwardly according to the forming groove 123 of the anvil die 121.

The shank portion 50 is integrally connected to the head portion 10 and is provided with at least two slits 61.

A portion of the shank portion 50 connected to the head portion 10 is defined as a connecting end, and the opposite end of the connecting end is defined as a free end.

The slits 61 is extended from the free end to the connecting end of the shank portion 50, and is connected to an inner space of the shank portion 50.

In addition, a length of the slits 61 is shorter than that of the shank portion 50, and the slits 61 are disposed circumferentially at the shank portion 50 with an even distance.

For example, three slits 61 are disposed at the shank portion 50 circumferentially, and a central angle formed by two slits 61 is 120 degree.

The central angle between the slits 61 is set within such strength range that buckling does not occur when the shank portion 50 penetrates the upper plate member 1. In one or more exemplary embodiments, the central angle can be set by various simulation tests.

The shank portion 50 according to an exemplary embodiment of the present invention includes a first portion 51 integrally connected to the head portion 10 and a plurality of second portions 52 integrally connected to the first portion 51 and disposed between the slits 61.

The first portion 51 is integrally connected to the head portion 10 and is adapted to support the second portions 52. The first portion 51 does not have hollow shape but has circular cross-sectional shape.

The second portion 52 is integrally connected to the first portion 51 and forms a space therein. The second portion 52 penetrates the upper plate member 1 and is deformed outwardly according to the forming groove 123 of the anvil die 121. Therefore, the second portion 52 is press-fitted into the lower plate member 2.

In addition, the slits 61 connects the inner space of the shank portion 50, that is the inner space of the second portions 52 with the space between the second portions 52.

The slits 61 are provide with a triangular groove 63, and the space between the second portions 52 is connected with the groove 63.

In this case, the groove 63 can be formed by a protrusion of a die for forming the slit 61 at the shank portion 50 when the rivet 200 according to an exemplary embodiment of the present invention is forged by the die.

In addition, edge surfaces of the second portion 52 facing with each other through the slit 61 are disposed in parallel with each other.

Since the shank portion 50 is provided with the second portions 52 divided by the slits 61, a portion of the upper plate member 1 corresponding to the inner space of the second portions 52 is connected to other portions of the upper plate member 1 corresponding to the slits 61.

That is, since the shank portion 50 is not formed as an annular piercing edge but is provided with the second portions 52 divided by the slits 61, the second portions 52 does not cut off the penetrated portion of the upper plate member 1 completely when the second portions 52 penetrate the upper plate member 1 and are press-fitted into the lower plate member 2.

The portion corresponding to the inner space of the second portions 52 and the other portions corresponding to the slits 61 in the penetrated portion of the upper plate member 1 can be used as a mechanical interlock of the upper plate member 1 and the lower plate member 2.

The central angle between the slits 61 is not limited to 120 degree and the number of slits 61 can be selected such that buckling does not occur when the second portion 52 penetrates the upper plate member 1.

Functions and effects of the self-piercing rivet 200 according to an exemplary embodiment of the present invention will be described in detail with reference to the accompanying drawings.

Figure 5:
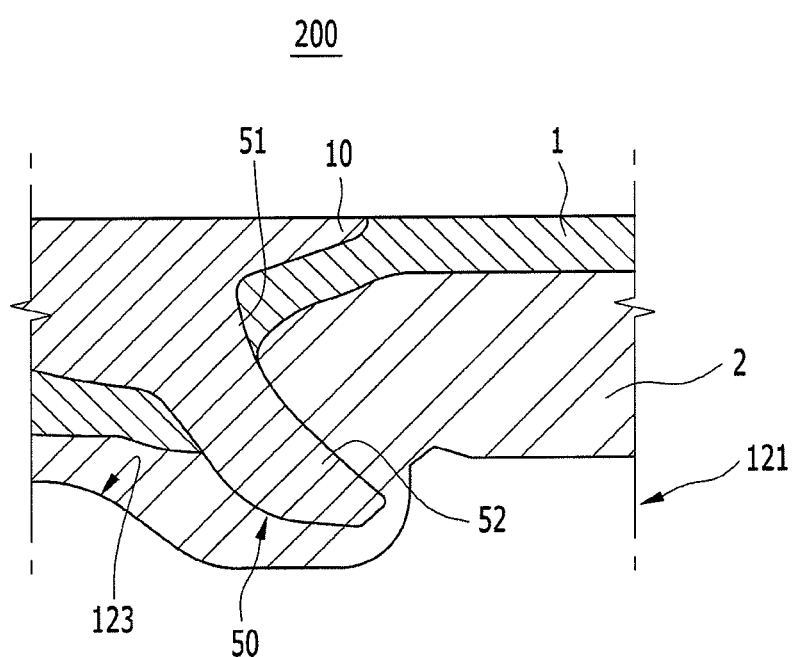
FIG. 5 to FIG. 7 are schematic diagrams for explaining functions of a self-piercing rivet according to an exemplary embodiment of the present invention.
Figure 6:
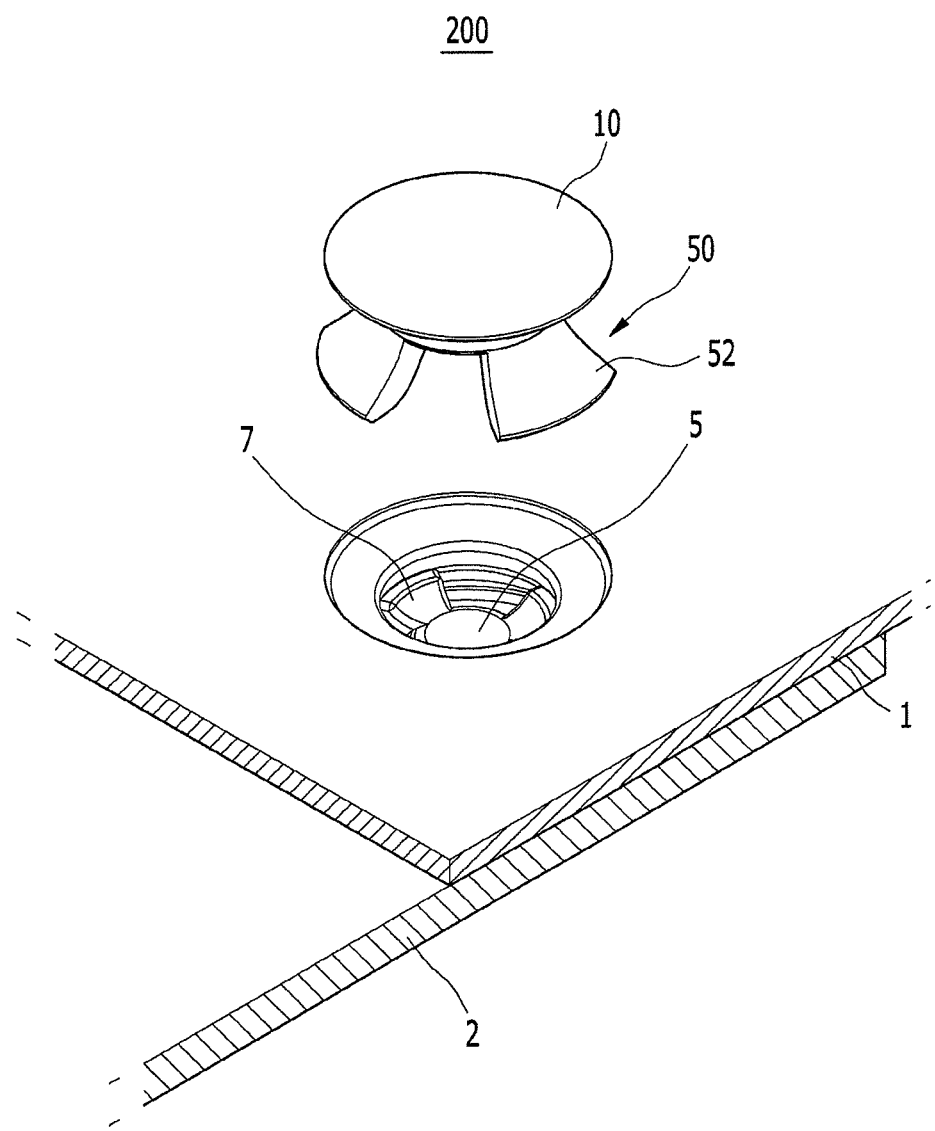
Figure 7:
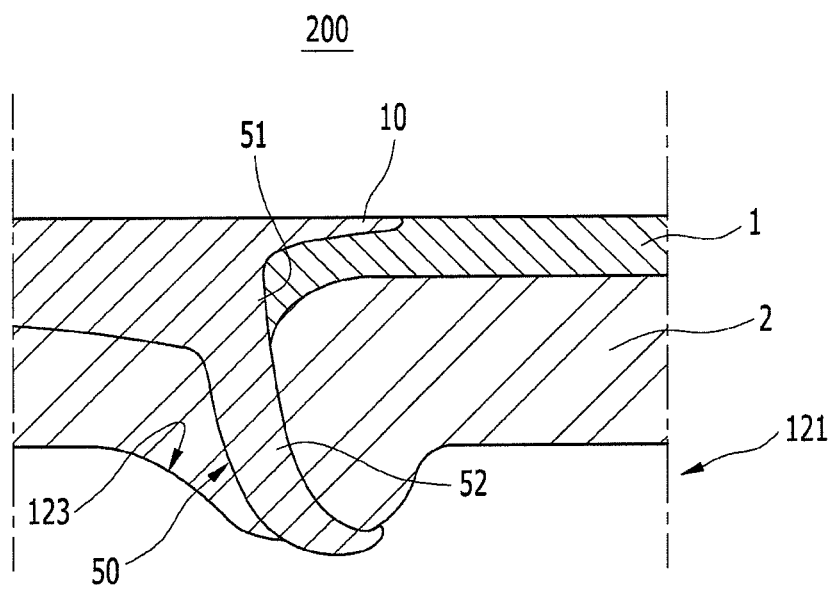

FIG. 5 to FIG. 7 are schematic diagrams for explaining functions of a self-piercing rivet according to an exemplary embodiment of the present invention.

Herein, FIG. 6 is a schematic diagram showing that the rivet 200 is separated from the upper plate member 1 and the lower plate member 2 in a state that the upper plate member 1 and the lower plate member 2 joined together through the rivet 200 according to an exemplary embodiment of the present invention.

In an exemplary embodiment of the present invention, the rivet 200 is supplied to the punch unit 103 of the self-piercing rivet system 100, and the upper plate member 1 and the lower plate member 2 overlapped with each other are positioned between the punch unit 103 and the anvil unit 105.

At this state, the punch cylinder 111 is moved forward by pneumatic or hydraulic pressure, and the damper 115 together with the anvil die 121 clamps the upper plate member 1 and the lower plate member 2.

If the punch cylinder 111 continues to move forward at this state, the punch 113 applies load to the head portion 10 of the rivet 200 according to an exemplary embodiment of the present invention.

Then, in a state that the second portion 52 of the shank portion 50 is supported by the first portion 51, the second portion 52 of the shank portion 50 penetrates the upper plate member 1 by the load of the punch 113, is deformed outwardly according to the forming groove 123 of the anvil die 121, and is press-fitted into the lower plate member 2, as shown in FIG. 5.

That is, in a state that the first portion 51 of the shank portion 50 supports the upper plate member 1, the second portion 52 penetrates the upper plate member 1, is deformed by the forming groove 123 of the anvil die 121, and is press-fitted into the lower plate member 2. Therefore, the upper plate member 1 and the lower plate member 2 are joined integrally.

The second portion 52 does not penetrate the lower plate member 2 completely, and the deformed end of the second portion 52 is enclosed in the lower plate member 2. Therefore, the deformed end of the second portion 52 forms the mechanical interlock of the upper plate member 1 and the lower plate member 2.

In this case, even though the second portion 52 of the shank portion 50 is divided by three slits 61, buckling does not occur and the second portion 52 can penetrate the upper plate member 1 easily.

Since the slits 61 is formed at the shank portion 50 of the rivet 200 and the plurality of the second portions 52 is formed by the slits 61, the portion 5 of the upper plate member 1 corresponding to the inner space of the second portions 52 is connected with the other portions 7 of the upper plate member 1 corresponding to the slits 61 as shown in FIG. 6.

That is, the deformed portion 5 of the upper plate member 1 corresponding to the inner space of the second portions 52 is connected with the deformed portion 7 of the upper plate member 1 corresponding to the slits 61.

In other words, when the second portions 52 penetrate the upper plate member 1, the deformed portion 5 corresponding to the inner space of the second portions 52 is not cut off and is connected to the deformed portion 7 of the upper plate member 1 corresponding to the slits 61.

In addition, the deformed portion 7 of the upper plate member 1 corresponding to the slits 61 is connected to the other portions except the penetrated portion of the upper plate member 1.

Since the portion 5 of the upper plate member 1 corresponding to the inner space of the second portions 52 can be connected to the other portions 7 of the upper plate member 1 corresponding to the slits 61 by the slits 61 of the shank portion 50, the penetrated portion of the upper plate member 1 is not cut off completely.

Since the penetrated portion of the upper plate member 1 does not remain as a dead metal that is completely cut off, the penetrated portion is used for reinforcing joining strength of the upper plate member 1 and the lower plate member 2.

The penetrated portion of the upper plate member 1 is used for generating mechanical interlock of the upper plate member 1 and the lower plate member 1 and 2, and catching the upper plate member 1 and the lower plate member 2 with a predetermined strength by the second portion 52 of the shank portion 50 provided with the slits 61.

Accordingly, even though only one rivet is used, the rotation of the upper plate member 1 and the lower plate member 2 is prevented and joining strength of the upper plate member 1 and the lower plate member 2 is further improved.

In addition, since joining objects are joined by using one rivet, productivity may improve and manufacturing cost may be reduced by reducing the number of joining processes and components.

Since the slits 61 are formed at the shank portion 50, joining load applied to the shank portion 50 can be reduced, and accordingly operating stability of the self-piercing rivet system 100 may be enhanced.

In other exemplary embodiments, the second portion 52 of the shank portion 50 penetrates the upper plate member 1, is deformed outwardly according to the forming groove 123 of the anvil die 121, and is press-fitted into the lower plate member 2. At this time, the second portion 52 of the shank portion 50 penetrates the lower plate member 2, is deformed outwardly by the forming groove 123, and supports a lower surface of the lower plate member 2 as a staple shape as shown in FIG. 7.

Since a portion of the lower plate member 2 corresponding to the inner space of the second portions 52 is connected with the other portions of the lower plate member 2 corresponding to the slits 61, a penetrated portion of the lower plate member 2 is not cut off completely.

Since the rivet 200 catches the upper plate member 1 to the lower plate member 2 with a predetermined strength by the second portion 52 of the shank portion 50 provided with the slits 61 and supports the lower surface of the lower plate member 2 as the staple shape, the joining strength of the upper plate member 1 and the lower plate member 2 can be further improved.

Figure 8:
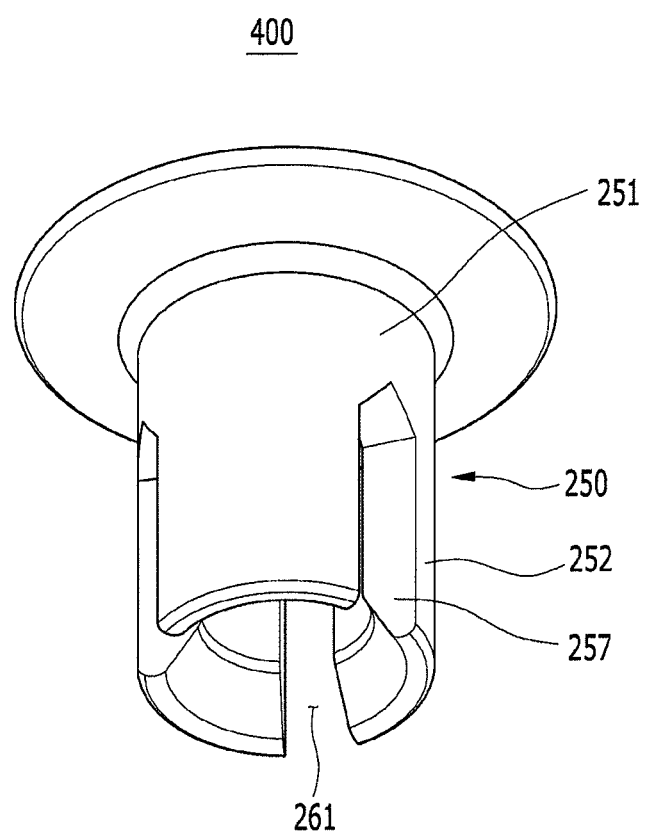
FIG. 8 is a perspective view of a self-piercing rivet according to another exemplary embodiment of the present invention.
Figure 9:
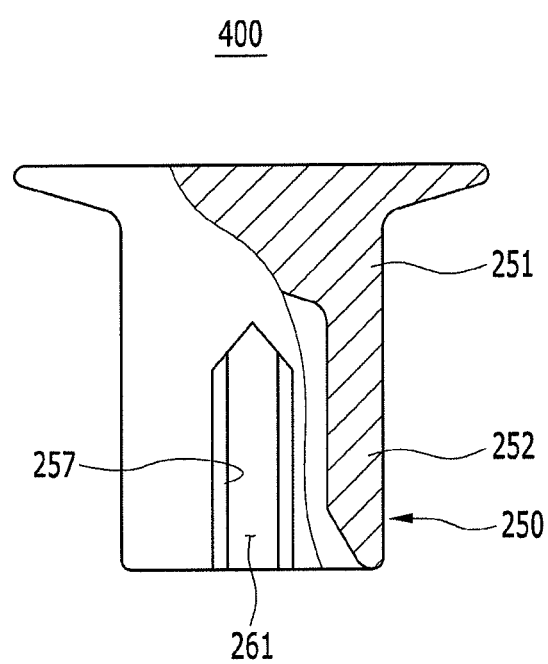
FIG. 9 is a partial cross-sectional view of a self-piercing rivet according to another exemplary embodiment of the present invention.
Figure 10:
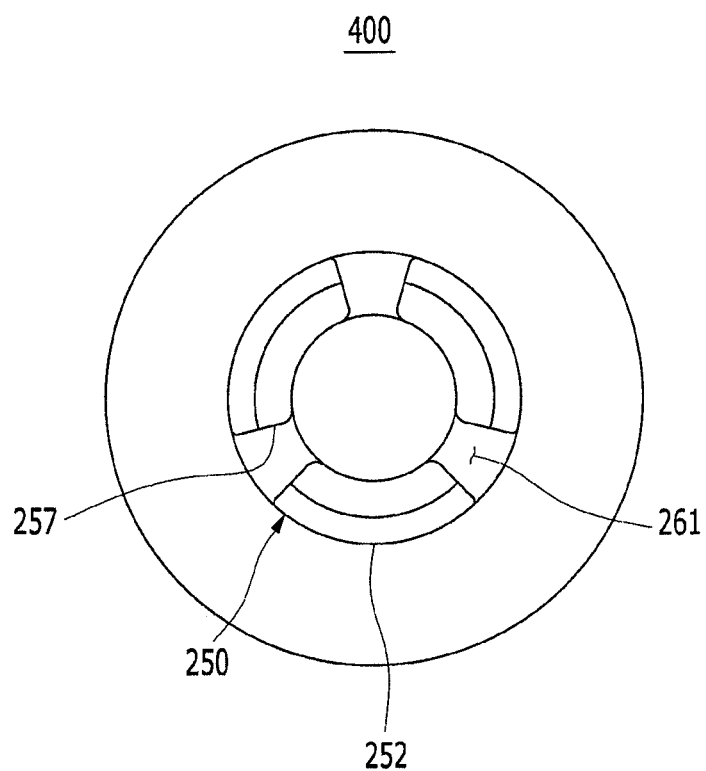
FIG. 10 is a bottom view of a self-piercing rivet according to another exemplary embodiment of the present invention.

FIG. 8 is a perspective view of a self-piercing rivet according to another exemplary embodiment of the present invention, FIG. 9 is a partial cross-sectional view of a self-piercing rivet according to another exemplary embodiment of the present invention, and FIG. 10 is a bottom view of a self-piercing rivet according to another exemplary embodiment of the present invention.

Referring to FIG. 8 to FIG. 10, a self-piercing rivet 400 according to another exemplary embodiment of the present invention is similar to that 200 according to an exemplary embodiment of the present invention. However, the edge surfaces of the second portion 252 facing with each other through the slit 261 is slanted toward the inner center of the first portion 251 according to another exemplary embodiment of the present invention.

That is, the shank portion 250 is provided with a slanted surface 257 formed at each of edge portions of the second portion 252 facing with each other through the slit 261. The slanted surfaces 257 are slanted toward an inner center of the first portion 251.

Other structures and functions of the self-piercing rivet 400 according to another exemplary embodiment of the present invention are the same as those according to an exemplary embodiment of the present invention. Therefore, a detailed description thereof will be omitted.

Because a shank portion is provide with slits according to an exemplary embodiment of the present invention, a penetrated portion of joining objects is not cut off completely and does not remain as dead metal. In addition, the penetrated portion is used for reinforcing joining strength of the joining objects.

Because the penetrated portion catches the joining objects with a predetermined strength by slits of a shank portion according to an exemplary embodiment of the present invention, rotation of the joining objects can be prevented and the joining strength may be further improved even though only one rivet is used.

Because the joining objects are joined by only one rivet according to an exemplary embodiment of the present invention, productivity may be improved manufacturing cost may be reduced by reducing the number of joining processes and components.

Since the slits are formed at the shank portion, joining load applied to the shank portion can be reduced, and accordingly operating stability of the self-piercing rivet system may be enhanced.

Since the second portion of the shank portion penetrates upper and lower plate members and supports the lower surface of the lower plate member as a staple shape, the joining strength of the upper plate member and the lower plate member can be further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A self-piercing rivet that is adapted to integrally join an upper plate member and a lower plate member overlapped with each other, the self-piercing rivet comprising:
   a head portion; and
   a shank portion integrally connected to the head portion and provided with more than two slits, wherein the shank portion comprises:
      a first portion integrally connected to the head portion and having circular cross-section; and
      a plurality of second portions integrally connected to the first portion and disposed between the slits, wherein the slit is provided with a triangular groove at the first portion, and the groove is connected to a space of the second portion, and wherein edge surfaces of the second portion facing with each other through the slit are disposed in parallel with respect to an inner center axis of the first portion.

2. The self-piercing rivet of claim 1, wherein the shank portion has a connecting end connected to the head portion and a free end being an opposite end of the connecting end, and
   the slits are extend from the free end to the connecting end of the shank portion.

3. The self-piercing rivet of claim 1, wherein the slits are connected with an inner space of the shank portion.

4. The self-piercing rivet of claim 1, wherein a length of the slit is shorter than that of the shank portion.

5. The self-piercing rivet of claim 1, wherein the slits are disposed at the shank portion circumferentially with an even distance.

6. The self-piercing rivet of claim 1, wherein a central angle of the slits is 120 degree.

7. The self-piercing rivet of claim 1, wherein the second portion is adapted to penetrate the upper plate member, deform outwardly, and be press-fit to the lower plate member.

8. A self-piercing rivet that is adapted to integrally join an upper plate member and a lower plate member overlapped with each other, the self-piercing rivet comprising:
   a head portion; and
   a shank portion integrally connected to the head portion and provided with more than two slits, wherein the shank portion comprises:
      a first portion integrally connected to the head portion and having circular cross-section; and
      a plurality of second portions integrally connected to the first portion and disposed between the slits, wherein the slit is provided with a triangular groove at the first portion, and the groove is connected to a space of the second portion, wherein edge surfaces of the second portion facing with each other through the slit are slanted toward an inner center axis of the first portion.

9. The self-piercing rivet of claim 1, wherein the shank portion is adapted to connect a portion of the upper plate member within the space with other portions of the upper plate member within the slits.

10. The self-piercing rivet of claim 1, wherein the shank portion is configured to penetrate the upper plate member and the lower plate member, deform outwardly, and support the lower plate member as a staple shape.

11. The self-piercing rivet of claim 1, that is adapted to join the upper plate member and the lower plate member of the same materials.

12. The self-piercing rivet of claim 1, that is adapted to join the upper plate member and the lower plate member of different materials.

* * * * *